(12) United States Patent
Hushchyn (10) Patent No.: US 10,228,972 B2
(45) Date of Patent: Mar. 12, 2019

(54) COMPUTER SYSTEMS AND COMPUTER-IMPLEMENTED METHODS FOR DYNAMICALLY ADAPTIVE DISTRIBUTION OF WORKLOAD BETWEEN CENTRAL PROCESSING UNIT(S) AND GRAPHICS PROCESSING UNIT(S)

(71) Applicant: Banuba Limited, Hong Kong (HK)

(72) Inventor: Yury Hushchyn, Vilnius (LT)

(73) Assignee: Banuba Limited, Wan Chai (HK)

( * ) Notice: Subject to any disclaimer, the term of this patent is extended or adjusted under 35 U.S.C. 154(b) by 0 days.

(21) Appl. No.: 16/015,055

(22) Filed: Jun. 21, 2018

(65) Prior Publication Data

US 2018/0373564 A1 Dec. 27, 2018

Related U.S. Application Data

(60) Provisional application No. 62/523,632, filed on Jun. 22, 2017.

(51) Int. Cl.
| | | |
|---|---|---|
| *G06F 9/46* | (2006.01) | |
| *G06F 9/48* | (2006.01) | |
| *G06F 15/18* | (2006.01) | |
| *G06F 9/50* | (2006.01) | |

(52) U.S. Cl.
CPC ......... *G06F 9/4893* (2013.01); *G06F 9/5044* (2013.01); *G06F 9/5061* (2013.01); *G06F 15/18* (2013.01)

(58) Field of Classification Search
None
See application file for complete search history.

(56) References Cited

U.S. PATENT DOCUMENTS

2012/0297163 A1* 11/2012 Breternitz ............. G06F 9/4856 712/22
2017/0192821 A1* 7/2017 Ki .......................... G06F 9/5027

* cited by examiner

*Primary Examiner* — Bing Zhao
(74) *Attorney, Agent, or Firm* — Greenberg Traurig, LLP (57) ABSTRACT

In some embodiments, the present invention provides an exemplary computing device, including at least: a scheduler processor; a CPU; a GPU; where the scheduler processor configured to: obtain a computing task; divide the computing task into: a first set of subtasks and a second set of subtasks; submit the first set to the CPU; submit the second set to the GPU; determine, for a first subtask of the first set, a first execution time, a first execution speed, or both; determine, for a second subtask of the second set, a second execution time, a second execution speed, or both; dynamically rebalance an allocation of remaining non-executed subtasks of the computing task to be submitted to the CPU and the GPU, based, at least in part, on at least one of: a first comparison of the first execution time to the second execution time, and a second comparison of the first execution speed to the second execution speed.

24 Claims, 3 Drawing Sheets

COMPUTER SYSTEMS AND COMPUTER-IMPLEMENTED METHODS FOR DYNAMICALLY ADAPTIVE DISTRIBUTION OF WORKLOAD BETWEEN CENTRAL PROCESSING UNIT(S) AND GRAPHICS PROCESSING UNIT(S)

CROSS-REFERENCE TO RELATED APPLICATIONS

This application claims benefit of U.S. provisional patent application Ser. No. 62/523,632 filed Jun. 22, 2017, which is herein incorporated by reference for all purposes.

FIELD OF THE INVENTION

Generally, the present disclosure is directed to improving operation of computing device by dynamically adaptive distribution of workload between central processing unit(s) and graphics processing unit(s), and computer systems and computer-implemented methods in accordance with thereof.

BACKGROUND

Typically, a computing device may have at least one central processing unit (CPU) and at least one graphics processing unit (GPU). In some cases, CPU(s) and GPU(s) may be located on the same silicon chip or on separate chips. Typically, a CPU may include an Arithmetic Logic Unit (aka ALU) and a Control Unit (aka CU). Typically, the ALU of a CPU is responsible for the arithmetic and logical operations of the computing system, and the CU is responsible for fetching the instruction program from the memory, decoding them and instructing other units such as ALU to execute the instructions. Typically, CPU(s) and GPU(s) may be found together within a single device everywhere, such as in embedded systems, mobile phones, personal computers and laptops, game consoles, and etc.

SUMMARY OF THE INVENTION

In some embodiments, the present invention provides for an exemplary computing device, including at least the following components: at least one scheduler processor; at least one central processing unit (CPU); at least one graphical processing unit (GPU); where the at least one scheduler processor is configured to: obtain at least one computing task; divide at least one part of the least one computing task into: i) a first set of subtasks and ii) a second set of subtasks; submit the first set of subtasks to be executed by the at least one CPU; submit the second set of subtasks to be executed by the at least one GPU; determine, for at least one first subtask of the first set of subtasks, at least one first execution time, at least one first execution speed, or both; determine, for at least one second subtask of the second set of subtasks, at least one second execution time, at least one second execution speed, or both; dynamically rebalance an allocation of remaining non-executed subtasks of the at least one computing task to be submitted to the at least one CPU and the at least one GPU, based, at least in part, on at least one of: i) a first comparison of the at least one first execution time to the at least one second execution time, and ii) a second comparison of the at least one first execution speed to the at least one second execution speed.

In some embodiments and, optionally, in any combination with any embodiment detailed above or below, the first set of subtasks and the second set of subtasks have an equal number of respective subtasks.

In some embodiments and, optionally, in any combination with any embodiment detailed above or below, the at least one scheduler processor is configured to divide the at least one part of the least one computing task into the first set of subtasks and the second set of subtasks is based, at least in part, on at least one data type of data that is respectively associated with the first set of subtasks and the second set of subtasks.

In some embodiments and, optionally, in any combination with any embodiment detailed above or below, the least one computing task is an execution of at least one machining learning algorithm.

In some embodiments and, optionally, in any combination with any embodiment detailed above or below, the first set of subtasks and the second set of subtasks are directed to respective components of the at least one machining learning algorithm.

In some embodiments and, optionally, in any combination with any embodiment detailed above or below, the at least one scheduler processor is configured to dynamically rebalance the allocation of remaining non-executed subtasks of the at least one computing task to be submitted for executing by the at least one CPU and the at least one GPU, based, at least in part, on at least one external condition, at least one internal condition, or both.

In some embodiments and, optionally, in any combination with any embodiment detailed above or below, the at least one external condition influences a performance of the at least one CPU differently than a performance of the at least one GPU.

In some embodiments and, optionally, in any combination with any embodiment detailed above or below, the at least one internal condition affects a performance of the at least one CPU differently than a performance of the at least one GPU.

In some embodiments and, optionally, in any combination with any embodiment detailed above or below, the at least one external condition is one of: i) an environmental temperature in which a device, housing the at least one CPU and the at least one GPU, is located; ii) a surrounding CPU-related temperature in a CPU vicinity of the at least one CPU within the device; iii) a surrounding GPU-related temperature in a GPU vicinity of the at least one GPU within the device; iv) a third-component temperature of at least one other component within the device; v) a third-component processing time of the at least one other component within the device; vi) atmospheric pressure; vii) an environmental humidity outside of the device; viii) an internal humidity inside of the device; and ix) a time lapsed since a start of at least one first application requiring resources of the at least one CPU, the at least one GPU, or both.

In some embodiments and, optionally, in any combination with any embodiment detailed above or below, the at least one internal condition is one of: i) an overall workload of the at least one CPU; ii) an overall workload of the at least one GPU; iii) a CPU temperature of the at least one CPU; iv) a GPU temperature of the at least one GPU; v) a first available cores number, identifying how many cores of the at least one CPU are available to execute at least one first portion of the remaining non-executed subtasks of the at least one computing task; vi) a second available cores number, identifying how many cores of the at least one GPU are available to execute at least one second portion of the remaining non-executed subtasks of the at least one computing task; vii) a first overall cores number of the at least one CPU; and viii) a second overall cores number of the at least one GPU.

In some embodiments and, optionally, in any combination with any embodiment detailed above or below, the at least one scheduler processor is configured to dynamically rebalance the allocation of remaining non-executed subtasks of the at least one computing task to be submitted for executing by the at least one CPU and the at least one GPU includes at least one of: dynamically increasing or decreasing a first amount of cores of the at least one CPU to be utilized to execute the at least one first portion of the remaining non-executed subtasks of the at least one computing task; and dynamically increasing or decreasing a second amount of cores of the at least one GPU to be utilized to execute the at least one second portion of the remaining non-executed subtasks of the at least one computing task.

In some embodiments and, optionally, in any combination with any embodiment detailed above or below, the at least one first portion of the remaining non-executed subtasks and the at least one second portion of the remaining non-executed subtasks are the same portion.

In some embodiments, the present invention provides for an exemplary computer-implemented method that may include at least the following steps of: obtaining, by at least one scheduler processor, at least one computing task; dividing, by the at least one scheduler processor, at least one part of the least one computing task into: i) a first set of subtasks and ii) a second set of subtasks; submitting, by the at least one scheduler processor, the first set of subtasks to be executed by at least one central processing unit (CPU); submitting, by the at least one processor, the second set of subtasks to be executed by at least one graphical processing unit (GPU); determining, by at least one scheduler processor, for at least one first subtask of the first set of subtasks, at least one first execution time, at least one first execution speed, or both; determining, by the at least one scheduler processor, for at least one second subtask of the second set of subtasks, at least one second execution time, at least one second execution speed, or both; dynamically rebalancing, by the at least one estimator processor, an allocation of remaining non-executed subtasks of the at least one computing task to be submitted to the at least one CPU and the at least one GPU, based, at least in part, on at least one of: i) a first comparison of the at least one first execution time to the at least one second execution time, and ii) a second comparison of the at least one first execution speed to the at least one second execution speed.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DESCRIPTION

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to affect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript). The aforementioned examples are, of course, illustrative and not restrictive.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (e.g., CPU, GPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. For example, a CPU may typically consist of several cores with cache memory that could handle a few software threads simultaneously. For example, a GPU may typically consist hundreds of cores (e.g., at least 100, at least 150, at least 200, at least 300, etc.) capable to handle thousands of threads at a time (e.g., at least 1000, at least 1500, at least 2000, at least 3000, etc.).

In some embodiments, GPU(s) may be configured to, for example, perform tasks that have parallel nature (e.g., applying algorithm(s) to Big Data), such as, but not limited to, accelerating and/or coding video, image recognition, rendering—e.g. visual effects of zooming, scrolling, and/or transitions. For example, three-dimensional games may be rendered utilizing GPU(s). In some embodiments, the term "Big Data" refers to data that can be described by the following characteristics:
1) Volume (quantity of generated and/or stored data (e.g., hundreds megabytes (MB) and more);
2) Variety (type and nature of the data), big data draws from text, images, audio, video; it may complete missing pieces through data fusion;
3) Velocity (speed at which the data is generated and/or processed); and
4) Veracity (data quality of captured data can vary greatly).

Figure 1:
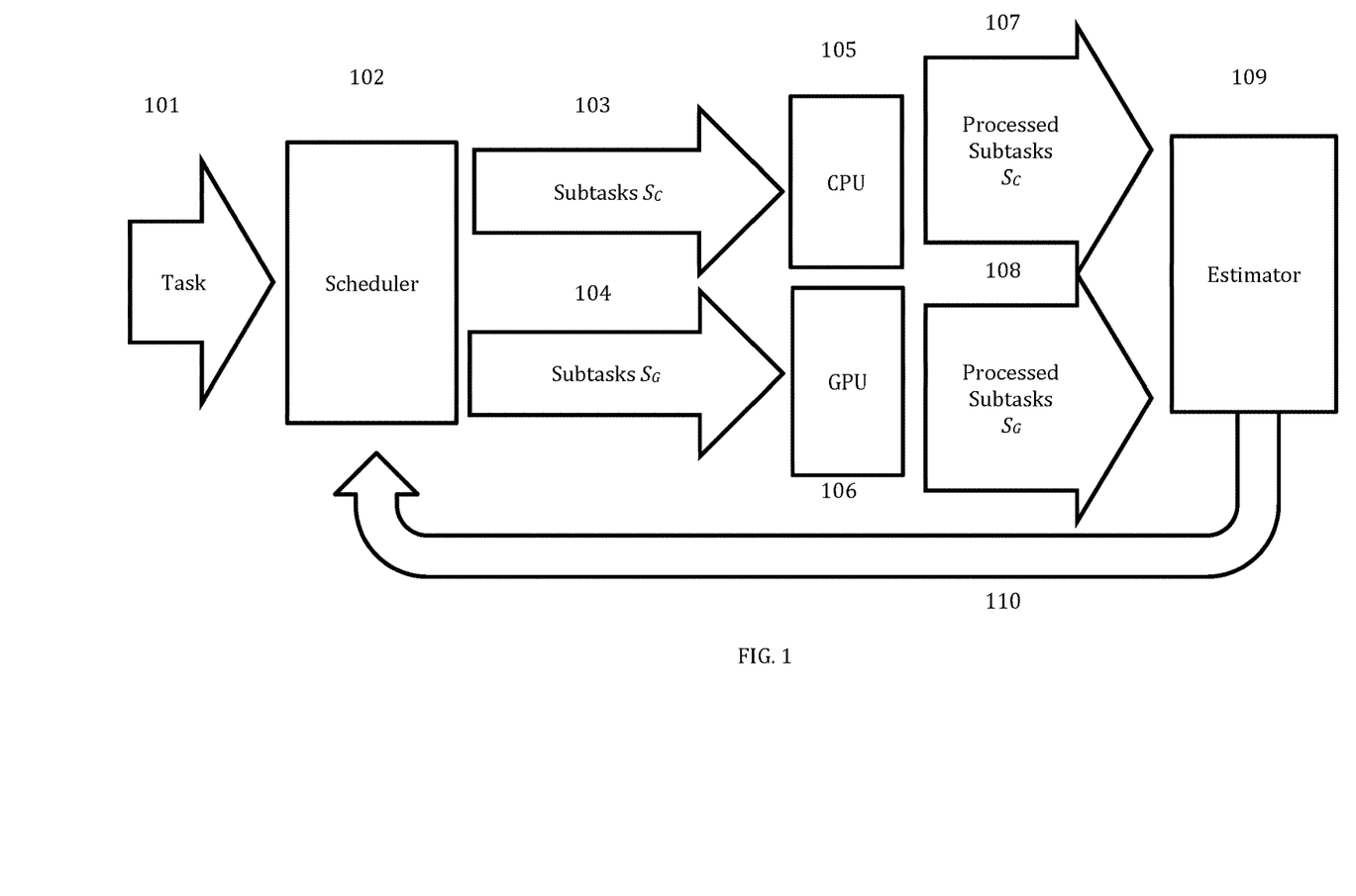
FIGS. 1-3 are representative of some exemplary aspects of the present invention in accordance with at least some principles of at least some embodiments of the present invention.

For example, FIG. 1 illustrates an exemplary computer architecture in accordance with certain embodiments of the present invention. As shown in FIG. 1, for example, at least one part of an exemplary task (101) may be initially divided by an exemplary inventive "Scheduler" module (102) (e.g., the exemplary Schedule module may include one or more schedule processors) into, for example without limitation, an equal number of subtasks Sc (103) and $S_G$ (104). In some embodiments, at least one portion of the subtasks Sc (103), input subtasks Sc, may be transmitted to an exemplary CPU (105), and at least one portion of the subtasks $S_G$ (104), input subtasks $S_G$, may be transmitted to an exemplary GPU (106). In some embodiments, the processed subtasks (107), corresponding to the input subtasks Sc, and the processed subtasks (108), corresponding to the input subtasks $S_G$, may be then transmitted to an exemplary inventive "Estimator" module (109) (e.g., the exemplary Estimator module may include one or more estimator processors) which may compare the execution times for the subtasks of both groups. In some embodiments, the comparison data may be transmitted from the "Estimator" module (109) to the "Scheduler" module (102). In some embodiments, the exemplary inventive "Scheduler" module (102) may utilize the comparison data to rebalance the reminder of subtasks as detailed herein. In some embodiments, the operation(s) performed by the Estimator module and the operation(s) performed by the Scheduler module may be performed by the same module (e.g., the Scheduler module).

Figure 2:
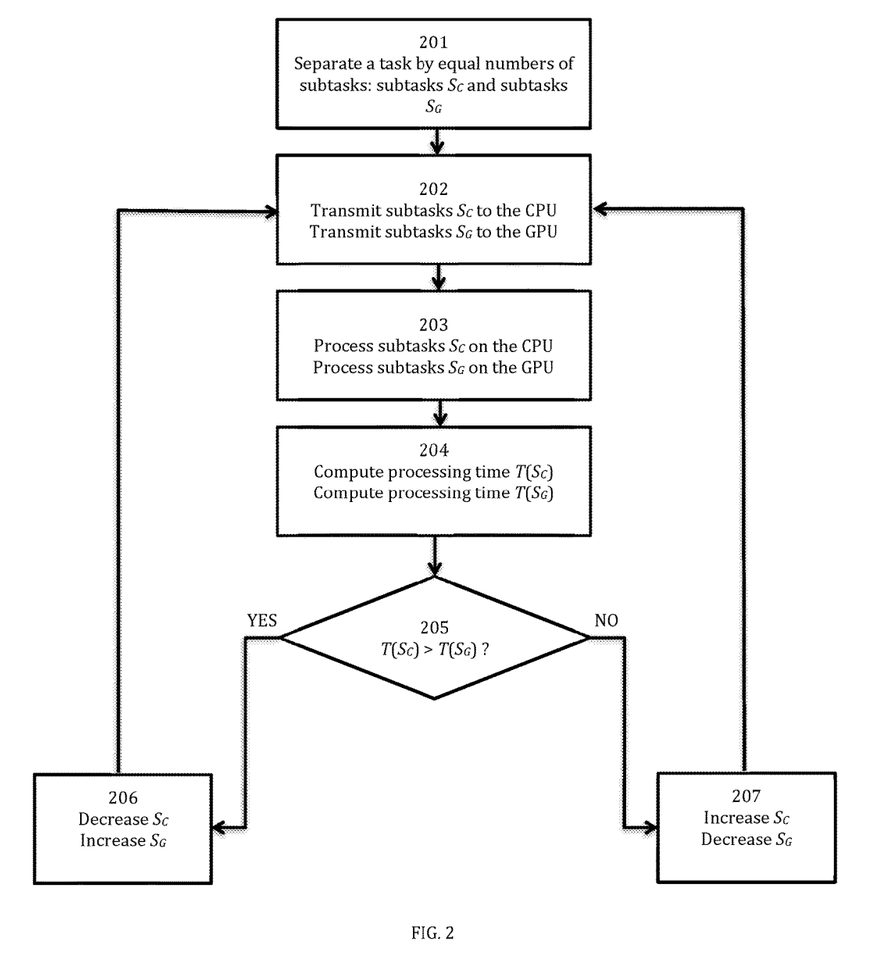

FIG. 2 illustrates an exemplary flowchart in accordance with certain embodiments of the present invention. For example, in some embodiments, initially, at step 201, the inventive "Scheduler" module (102) splits a task into equal or closely equal number of subtasks Sc (103) and $S_G$ (104). For example, in some embodiments, at step 202, the inventive "Scheduler" module (102) then transmits (1) the at least one portion of the respective subtasks Sc (103) to the exemplary CPU (105) and the at least one portion of the respective subtasks $S_G$ (104) to the exemplary GPU (106). For example, in some embodiments, at step 203, the exemplary CPU and the exemplary GPU process their respective at least one portions of subtasks. Then, for example, in some embodiments, at step 204, the exemplary inventive "Estimator" module (109) determines/computes execution times $T(S_G)$ and $T(S_C)$ for the processed portions of the subtasks Sc (103) and $S_G$ (104). At step 205, the inventive "Scheduler" module (102) may be configured/programmed to compare/determine which of the exemplary CPU (105) and the exemplary GPU (106) would have a higher execution speed or a lower execution times, $T(S_C)$ and $T(S_G)$. For example, if $T(S_C) > T(S_G)$ at a particular time, at step 206, the inventive "Scheduler" module (102) may be configured/programmed to decrease a number of remaining subtasks Sc (103) to be further distributed to the exemplary CPU (105) and increase a number of remaining subtasks $S_G$ (104)—the inventive "Scheduler" module (102) may be configured/programmed to dynamically redirect at least another portion of the previously designated subtasks Sc (103) to the exemplary GPU (106), thus increasing the number of remaining subtasks $S_G$ (104).

For example, at step 207, if $T(SG) > T(SC)$ at a particular time, the inventive "Scheduler" module (102) may be configured/programmed to increase a number of remaining subtasks Sc (103) to be further distributed to the exemplary CPU (105) and decrease a number of remaining subtasks $S_G$ (104)—the inventive "Scheduler" module (102) may be configured/programmed to dynamically redirect at least another portion of the previously designated subtasks $S_G$ (104) to the exemplary CPU (105), thus increasing the number of the remaining subtasks Sc (103). In some embodiments, the steps 202-207 of workflow of FIG. 2 may be repeated until all subtasks of the task 101 would be processed.

In some embodiments, while, in supra, the specific example of the exemplary inventive workflow of FIG. 2 has been detailed with respect to the inventive architecture of FIG. 1, it is understood that such example is not limited, and other similarly suitable implementation are contemplated herein.

For example, in some embodiments, as detailed above, the inventive "Scheduler" module (102) may be configured/programmed to dynamically redistribute the remaining subtasks of the exemplary current task based on the computed speeds of execution. In some embodiments, the inventive "Scheduler" module (102) may be configured/programmed to dynamically redistribute all subtasks of the exemplary current tasks, at once, based on execution times computed during previous execution(s) of at least one past task.

In some embodiments and, optionally, in any combination with any embodiment detailed above or below, the inventive modules of the present invention may be configured/programmed to dynamically redistribute subtasks based on one or more conditions which is/are indicative of performance of a particular CPU and/or a particular GPU. For example, exemplary conditions may be, but not limited to, general (e.g., overall) workload in relation to other tasks, time elapsed since start of one or several applications, a temperature of CPU and/or GPU, external conditions (temperature (e.g., temperature(s) of other internal component(s)), pressure (e.g., atmospheric pressure), humidity, processing time(s) of other internal component(s), etc.) and other similar conditions. For example, as a result of an external temperature rise (for example, the similar effect may be caused by other conditions, such as pressure, humidity, etc.), the exemplary CPU (105) may drop its frequency due to the thermal throttling. In some embodiments, the inventive "Scheduler" module (102) may be configured/programmed to then estimates that the CPU core(s) of the exemplary CPU (105) perform slower than the GPU core(s) of the exemplary GPU (106) and assign more tasks/subtasks to be executed on the GPU core(s) of the exemplary GPU (106) leaving fewer tasks for the exemplary CPU (105). In some embodiments, the inventive "Scheduler" module (102) may be configured/programmed to dynamical redistribute workflow based, at least in part, on one or more external conditions that may influence both types of processor units in a different way. In some embodiments and, optionally, in any combination with any embodiment detailed above or below, the inventive "Scheduler" module (102) may be configured/programmed to dynamical redistribute workload by dynamical getting involved (increase or decrease) a various number of cores of both the exemplary CPU (105) and the exemplary GPU (106) to result in a rise in the performance time. In some embodiments and, optionally, in any combination with any embodiment detailed above or below, one or more of the external conditions may be determined indirectly by measuring the current performance time of the particular CPU or GPU core(s).

Figure 3:
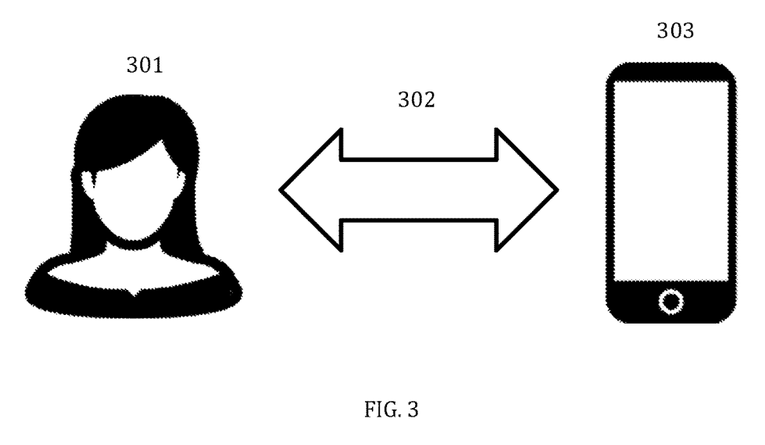

FIG. 3 illustrates an exemplary implementation when at least a portion of the inventive components of the present invention reside in a mobile device (303), and tasks related to a user (301) interacting (302) with the mobile device (303) are executed in accordance with one or more principles of the present invention. For example, in some embodiments, the one or more principles of the present invention and associated modules may be utilized in mobile applications which are typically associated with a higher use of processor resources, such as in cases of, but not limited to, mobile application(s) directed to face recognition, face tracking, augmented reality, machine learning, and others.

In some embodiments, the one or more principles of the present invention and associated inventive modules may allow to achieve a better quality (e.g., a clearer picture, a faster rendition, etc.) with the given processing power (i.e., processor units).

In some embodiments and, optionally, in any combination with any embodiment detailed above or below, the one or more principles of the present invention and associated inventive modules may allow to divide and distribute various information/data types, such as, but not limited to, tasks related to execution of machine learning algorithms (e.g., random forests, gradient boosting) and/or neural networks (e.g., fully recurrent networks, convolutional networks). In some embodiments and, optionally, in any combination with any embodiment detailed above or below, the distribution of workload (i.e., separation into discrete tasks and, then, subtasks) may be performed at the algorithmic level. For example, the random forest algorithm may be paralleled distributing and redistributing trees, neural networks layers and neurons, etc.

In some embodiments and, optionally, in any combination with any embodiment detailed above or below, the inventive modules of the present invention may be configured/programmed to execute, but not limited to, one or more the following algorithms:

optimization algorithms (Alpha-beta pruning, Branch and bound, Bruss algorithm, Chain matrix multiplication, Combinatorial optimization, Constraint satisfaction, Chaff algorithm, Davis-Putnam algorithm, Davis-Putnam-Logemann-Loveland algorithm, Exact cover problem, Cross-entropy method, Differential evolution, Dynamic Programming, Ellipsoid method, Evolutionary computation, Golden section search, Gradient descent, Harmony search, Interior point method, Linear programming, Line search, Local search, Minimax, Nearest neighbor search, Newton's method in optimization, Nonlinear optimization, Odds algorithm, Simulated annealing, Stochastic tunneling, Subset sum);

linear algebra algorithms (matrix operations, LU decomposition, QR decomposition, singular value decomposition, eigenvalues, other types of matrix decomposition;

machine learning (dimensionality reduction, ensemble learning, instance-based algorithms, regression analysis, regularization algorithms, classifiers, artificial neural networks, Bayesian analysis, decision trees, linear classifiers, association rule learning hierarchical clustering, cluster analysis, anomaly detection, reinforcement learning, deep learning).

Illustrative Examples of Using at Least Some Inventive Techniques of the Present Invention for Various Types of Data Table 1 shows an illustrative example of processing an exemplary dataset (d).

TABLE 1

```
if processor_unit = "a"
    lower_limit := 1
    upper_limit := round(d.length/2)
else if processor_unit = "b"
    lower_limit := round(d.length/2) + 1
    upper_limit := d.length
for i from lower_limit to upper_limit by 1
    some_arbitrary_operation(d[i])
```

In Table 1, when the execution time for such pair is measured, the inventive "Scheduler" module (102) may be configured/programmed to dynamically rebalance the ratio of data for the next pair. For example, initially equal portions of data may be sent to the exemplary CPU (105) and the exemplary GPU (106), and the exemplary CPU (105) processed its part faster than the exemplary GPU (106). Then, for example, the inventive "Scheduler" module (102) may be configured/programmed to decrease an amount of the data to be sent in the next pair to the exemplary GPU (106) and increase the portion assigned to the exemplary CPU (105).

In some embodiments, after certain initial tasks/subtasks have been distributed and processed, the inventive "Scheduler" module (102) may be configured/programmed to dynamically redistribute all remaining tasks/subtasks to only the exemplary CPU (105) or the exemplary GPU (106) in accordance with one or more principles of the present invention.

Table 2 shows an illustrative example how the inventive "Scheduler" module (102) may be configured/programmed to divide a task (e.g., executing an exemplary algorithm with an exemplary dataset (d)) into subtasks (e.g., having similar computational complexity) and then allocate each subtask to a particular processor for execution. For example, Table 2 shows how, based on the performance of the previous pair, unequal numbers of subtasks being assigned to the exemplary GPU (106), leaving a fewer subtasks to the exemplary CPU (105). Specifically, Table 2 shows how the total of similar functions may be calculated for the same data (e.g., function $x^a$ for various a, but the same vector x).

TABLE 2

```
if processor_unit = "a"
    f_a:= x^alpha
else if processor_unit = "b"
    f_b:= x^beta
else if processor_unit = "c"
    f_c:= x^gamma
else if . . .
for i in processor_units
    some_arbitrary_operation(f_a, f_b, f_c, . . .)
```

In some embodiments, the inventive "Scheduler" module (102) may be configured/programmed to utilize a map-reduce paradigm on a variety of machine learning algorithms, including, but not limited to, linear and logistic regression, k-means, naive Bayes, SVM, PCA, Gaussian discriminant analysis, and artificial neural networks. For example, the inventive "Scheduler" module (102) may be configured/programmed to utilize the same allocation and rebalancing method in pairs of subtasks, while utilize algorithm-specific subtasks. For example, in random forests, subtasks may be trees. In another example, in artificial neural networks, subtasks may be convolutions.

In some embodiments, the inventive "Scheduler" module (102) may be configured/programmed to account that some algorithms may require a hyperparameter optimisation to solve optimisation problem(s). For example, he inventive "Scheduler" module (102) may be configured/programmed to direct the execution of each set of optimisation parameters as a subtask in parallel, and then find the optimal value.

In some embodiments, the inventive "Scheduler" module (102) may be configured/programmed to account that some machine learning algorithms may require computing a gradient (e.g., the loss function) with respect to a vector of model parameters. For example, the inventive "Scheduler" module (102) may be configured/programmed to direct the calculation of the gradient also in parallel (e.g., in the case of deep learning algorithms). For example, the inventive "Scheduler" module (102) may be configured/programmed to divide the execution into subtasks that may consist of partial derivatives with respect to variables and/or being calculated on various portions of the data set.

In some embodiments, the inventive methods and the inventive systems of the present inventions can be incorporated, partially or entirely into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the present invention provides for an exemplary computing device, including at least the following components: at least one scheduler processor; at least one central processing unit (CPU); at least one graphical processing unit (GPU); where the at least one scheduler processor is configured to: obtain at least one computing task; divide at least one part of the least one computing task into: i) a first set of subtasks and ii) a second set of subtasks; submit the first set of subtasks to be executed by the at least one CPU; submit the second set of subtasks to be executed by the at least one GPU; determine, for at least one first subtask of the first set of subtasks, at least one first execution time, at least one first execution speed, or both; determine, for at least one second subtask of the second set of subtasks, at least one second execution time, at least one second execution speed, or both; dynamically rebalance an allocation of remaining non-executed subtasks of the at least one computing task to be submitted to the at least one CPU and the at least one GPU, based, at least in part, on at least one of: i) a first comparison of the at least one first execution time to the at least one second execution time, and ii) a second comparison of the at least one first execution speed to the at least one second execution speed.

In some embodiments and, optionally, in any combination with any embodiment detailed above or below, the first set of subtasks and the second set of subtasks have an equal number of respective subtasks.

In some embodiments and, optionally, in any combination with any embodiment detailed above or below, the at least one scheduler processor is configured to divide the at least one part of the least one computing task into the first set of subtasks and the second set of subtasks is based, at least in part, on at least one data type of data that is respectively associated with the first set of subtasks and the second set of subtasks.

In some embodiments and, optionally, in any combination with any embodiment detailed above or below, the least one computing task is an execution of at least one machining learning algorithm.

In some embodiments and, optionally, in any combination with any embodiment detailed above or below, the first set of subtasks and the second set of subtasks are directed to respective components of the at least one machining learning algorithm.

In some embodiments and, optionally, in any combination with any embodiment detailed above or below, the at least one scheduler processor is configured to dynamically rebalance the allocation of remaining non-executed subtasks of the at least one computing task to be submitted for executing by the at least one CPU and the at least one GPU, based, at least in part, on at least one external condition, at least one internal condition, or both.

In some embodiments and, optionally, in any combination with any embodiment detailed above or below, the at least one external condition influences a performance of the at least one CPU differently than a performance of the at least one GPU.

In some embodiments and, optionally, in any combination with any embodiment detailed above or below, the at least one internal condition affects a performance of the at least one CPU differently than a performance of the at least one GPU.

In some embodiments and, optionally, in any combination with any embodiment detailed above or below, the at least one external condition is one of: i) an environmental temperature in which a device, housing the at least one CPU and the at least one GPU, is located; ii) a surrounding CPU-related temperature in a CPU vicinity of the at least one CPU within the device; iii) a surrounding GPU-related temperature in a GPU vicinity of the at least one GPU within the device; iv) a third-component temperature of at least one other component within the device; v) a third-component processing time of the at least one other component within the device; vi) atmospheric pressure; vii) an environmental humidity outside of the device; viii) an internal humidity inside of the device; and ix) a time lapsed since a start of at least one first application requiring resources of the at least one CPU, the at least one GPU, or both.

In some embodiments and, optionally, in any combination with any embodiment detailed above or below, the at least one internal condition is one of: i) an overall workload of the at least one CPU; ii) an overall workload of the at least one GPU; iii) a CPU temperature of the at least one CPU; iv) a GPU temperature of the at least one GPU; v) a first available cores number, identifying how many cores of the at least one CPU are available to execute at least one first portion of the remaining non-executed subtasks of the at least one computing task; vi) a second available cores number, identifying how many cores of the at least one GPU are available to execute at least one second portion of the remaining non-executed subtasks of the at least one computing task; vii) a first overall cores number of the at least one CPU; and viii) a second overall cores number of the at least one GPU.

In some embodiments and, optionally, in any combination with any embodiment detailed above or below, the at least one scheduler processor is configured to dynamically rebalance the allocation of remaining non-executed subtasks of the at least one computing task to be submitted for executing by the at least one CPU and the at least one GPU includes at least one of: dynamically increasing or decreasing a first amount of cores of the at least one CPU to be utilized to execute the at least one first portion of the remaining non-executed subtasks of the at least one computing task; and dynamically increasing or decreasing a second amount of cores of the at least one GPU to be utilized to execute the at least one second portion of the remaining non-executed subtasks of the at least one computing task. In some embodiments and, optionally, in any combination with any embodiment detailed above or below, the at least one first portion of the remaining non-executed subtasks and the at least one second portion of the remaining non-executed subtasks are the same portion.

In some embodiments, the present invention provides for an exemplary computer-implemented method that may include at least the following steps of: obtaining, by at least one scheduler processor, at least one computing task; dividing, by the at least one scheduler processor, at least one part of the least one computing task into: i) a first set of subtasks and ii) a second set of subtasks; submitting, by the at least one scheduler processor, the first set of subtasks to be executed by at least one central processing unit (CPU); submitting, by the at least one processor, the second set of subtasks to be executed by at least one graphical processing unit (GPU); determining, by at least one scheduler processor, for at least one first subtask of the first set of subtasks, at least one first execution time, at least one first execution speed, or both; determining, by the at least one scheduler processor, for at least one second subtask of the second set of subtasks, at least one second execution time, at least one second execution speed, or both; dynamically rebalancing, by the at least one estimator processor, an allocation of remaining non-executed subtasks of the at least one computing task to be submitted to the at least one CPU and the at least one GPU, based, at least in part, on at least one of: i) a first comparison of the at least one first execution time to the at least one second execution time, and ii) a second comparison of the at least one first execution speed to the at least one second execution speed.

While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other.

Further still, the various steps may be carried out in any desired order (and any desired steps may be added and/or any desired steps may be eliminated).

What is claimed is:

1. A computing device, comprising:
at least one scheduler processor;
at least one central processing unit (CPU);
at least one graphical processing unit (GPU);
wherein the at least one scheduler processor is configured to:
obtain at least one computing task;
divide at least one part of the least one computing task into:
i) a first set of subtasks and
ii) a second set of subtasks;
wherein the first set of subtasks and the second set of subtasks are distinct operations;
submit the first set of subtasks to be executed by the at least one CPU;
submit the second set of subtasks to be executed by the at least one GPU;
determine, for at least one first subtask of the first set of subtasks, at least one first execution time, at least one first execution speed, or both;
determine, for at least one second subtask of the second set of subtasks, at least one second execution time, at least one second execution speed, or both;
dynamically determine a plurality of distribution conditions that comprises:
i) at least one of:
1) one or more CPU performance conditions of the at least one CPU that are distinct from the at least one first execution time and the at least one first execution speed, or
2) one or more GPU performance conditions of the at least one GPU that are distinct from the at least one second execution time and the at least one second execution speed, and
ii) at least one of:
1) one or more CPU-related external environmental conditions to which the at least one CPU is exposed or
2) one or more GPU-related external environmental conditions to which the at least one GPU is exposed; and
dynamically rebalance an allocation of remaining non-executed subtasks of the at least one computing task to be submitted to a particular CPU of the at least one CPU and a particular GPU of the at least one GPU, based, at least in part, on the plurality of distribution conditions and at least one of:
i) a first comparison of the at least one first execution time to the at least one second execution time, or
ii) a second comparison of the at least one first execution speed to the at least one second execution speed.

2. The computing device of claim 1, wherein the first set of subtasks and the second set of subtasks have an equal number of respective subtasks.

3. The computing device of claim 1, wherein the at least one scheduler processor is configured to divide the at least one part of the least one computing task into the first set of subtasks and the second set of subtasks is based, at least in part, on at least one data type of data that is respectively associated with the first set of subtasks and the second set of subtasks.

4. The computing device of claim 1, wherein the least one computing task is an execution of at least one machining learning algorithm.

5. The computing device of claim 4, wherein the first set of subtasks and the second set of subtasks are directed to respective components of the at least one machining learning algorithm.

6. The computing device of claim 1, wherein the one or more CPU-related external environmental condition and the one or more GPU-related external environmental condition are distinct conditions.

7. The computing device of claim 1, wherein the one or more CPU-related external environmental conditions affect a performance of the at least one CPU differently than a performance of the at least one GPU.

8. The computing device of claim 1, wherein the one or more CPU performance conditions affect a performance of the at least one CPU differently than a performance of the at least one GPU.

9. The computing device of claim 1,
wherein the one or more CPU-related external environmental conditions are at least one of:
i) an environmental temperature measured within a device that houses the at least one CPU and the at least one GPU, and
ii) a surrounding temperature measured in a respective vicinity of the at least one CPU,
iii) a third-component temperature of at least one other component within the device,
iv) atmospheric pressure,
v) an outside humidity measured outside of the device, or
vi) an internal humidity measured inside of the device; and
wherein the one or more GPU-related external environmental conditions are at least one of:
i) the environmental temperature measured within the device,
ii) a surrounding temperature measured in a respective vicinity of the at least one GPU,
iii) the third-component temperature of the at least one other component within the device,
iv) the atmospheric pressure,
v) the outside humidity measured outside of the device;
vi) the internal humidity measured within the device.

10. The computing device of claim 1,
wherein the one or more CPU performance conditions are at least one of:
i) an overall CPU workload of the at least one CPU,
ii) a time lapsed since a start of at least one first application requiring resources of the at least one CPU,
iii) a CPU temperature of the at least one CPU,
iv) a first available cores number, identifying how many cores of the at least one CPU are available to execute at least one first portion of the remaining non-executed subtasks of the at least one computing task, or
v) a first overall cores number of the at least one CPU; and
wherein the one or more GPU performance conditions are at least one of:
i) an overall GPU workload of the at least one GPU,
ii) a time lapsed since a start of at least one second application requiring resources of the at least one GPU,
iii) a GPU temperature of the at least one GPU,
iv) a second available cores number, identifying how many cores of the at least one GPU are available to execute at least one second portion of the remaining non-executed subtasks of the at least one computing task, or v) a second overall cores number of the at least one GPU.

11. The computing device of claim 10, wherein the at least one scheduler processor is configured to dynamically rebalance the allocation of remaining non-executed subtasks of the at least one computing task to be submitted to the particular CPU and the particular GPU, by at least one of:
dynamically increasing or decreasing a first amount of cores of the particular CPU to be utilized to execute the at least one first portion of the remaining non-executed subtasks of the at least one computing task; and
dynamically increasing or decreasing a second amount of cores of the particular GPU to be utilized to execute the at least one second portion of the remaining non-executed subtasks of the at least one computing task.

12. The computing device of claim 11, wherein the at least one first portion of the remaining non-executed subtasks and the at least one second portion of the remaining non-executed subtasks are the same portion.

13. A computer-implemented method, comprising:
obtaining, by at least one scheduler processor, at least one computing task;
dividing, by the at least one scheduler processor, at least one part of the least one computing task into:
i) a first set of subtasks and
ii) a second set of subtasks;
wherein the first set of subtasks and the second set of subtasks are distinct operations;
submitting, by the at least one scheduler processor, the first set of subtasks to be executed by at least one central processing unit (CPU);
submitting, by the at least one processor, the second set of subtasks to be executed by at least one graphical processing unit (GPU);
determining, by at least one scheduler processor, for at least one first subtask of the first set of subtasks, at least one first execution time, at least one first execution speed, or both;
determining, by the at least one scheduler processor, for at least one second subtask of the second set of subtasks, at least one second execution time, at least one second execution speed, or both;
dynamically determine a plurality of distribution conditions that comprises:
i) at least one of:
1) one or more CPU performance conditions of the at least one CPU that are distinct from the at least one first execution time and the at least one first execution speed, or
2) one or more GPU performance conditions of the at least one GPU that are distinct from the at least one second execution time and the at least one second execution speed, and
ii) at least one of:
1) one or more CPU-related external environmental conditions to which the at least one CPU is exposed or
2) one or more GPU-related external environmental conditions to which the at least one GPU is exposed; and
dynamically rebalancing, by the at least one estimator processor, an allocation of remaining non-executed subtasks of the at least one computing task to be submitted to a particular CPU of the at least one CPU and a particular GPU of the at least one GPU, based, at least in part, on the plurality of distribution conditions and at least one of:
i) a first comparison of the at least one first execution time to the at least one second execution time, and
ii) a second comparison of the at least one first execution speed to the at least one second execution speed.

14. The method of claim 13, wherein the first set of subtasks and the second set of subtasks have an equal number of respective subtasks.

15. The method of claim 13, wherein the step of dividing the at least one part of the least one computing task into the first set of subtasks and the second set of subtasks is based, at least in part, on at least one data type of data that is respectively associated with the first set of subtasks and the second set of subtasks.

16. The method of claim 13, wherein the least one computing task is an execution of at least one machining learning algorithm.

17. The method of claim 16, wherein the first set of subtasks and the second set of subtasks are directed to respective components of the at least one machining learning algorithm.

18. The method of claim 13, wherein the one or more CPU-related external environmental condition and the one or more GPU-related external environmental condition are distinct conditions.

19. The method of claim 13, wherein the one or more CPU-related external environmental conditions affect a performance of the at least one CPU differently than a performance of the at least one GPU.

20. The method of claim 13, wherein the one or more CPU performance conditions affect a performance of the at least one CPU differently than a performance of the at least one GPU.

21. The method of claim 13,
wherein the one or more CPU-related external environmental conditions are at least one of:
i) an environmental temperature measured within a device that houses the at least one CPU and the at least one GPU, and
ii) a surrounding temperature measured in a respective vicinity of the at least one CPU,
iii) a third-component temperature of at least one other component within the device,
iv) atmospheric pressure,
v) an outside humidity measured outside of the device, or
vi) an internal humidity measured inside of the device; and
wherein the one or more GPU-related external environmental conditions are at least one of:
i) the environmental temperature measured within the device,
ii) a surrounding temperature measured in a respective vicinity of the at least one GPU,
iii) the third-component temperature of the at least one other component within the device,
iv) the atmospheric pressure;
v) the outside humidity measured outside of the device;
vi) the internal humidity measured within the device.

22. The method of claim 13,
wherein the one or more CPU performance conditions are at least one of:
i) an overall CPU workload of the at least one CPU,
ii) a time lapsed since a start of at least one first application requiring resources of the at least one CPU,
iii) a CPU temperature of the at least one CPU, iv) a first available cores number, identifying how many cores of the at least one CPU are available to execute at least one first portion of the remaining non-executed subtasks of the at least one computing task, or
v) a first overall cores number of the at least one CPU; and wherein the one or more GPU performance conditions are at least one of:
i) an overall GPU workload of the at least one GPU,
ii) a time lapsed since a start of at least one second application requiring resources of the at least one GPU,
iii) a GPU temperature of the at least one GPU,
iv) a second available cores number, identifying how many cores of the at least one GPU are available to execute at least one second portion of the remaining non-executed subtasks of the at least one computing task, or
v) a second overall cores number of the at least one GPU.

23. The method of claim 22, wherein the step of dynamically rebalancing, by the at least one estimator processor, the allocation of remaining non-executed subtasks of the at least one computing task to be submitted to the particular CPU and the particular GPU, by at least one of:
dynamically increasing or decreasing a first amount of cores of the particular CPU to be utilized to execute the at least one first portion of the remaining non-executed subtasks of the at least one computing task; and
dynamically increasing or decreasing a second amount of cores of the particular GPU to be utilized to execute the at least one second portion of the remaining non-executed subtasks of the at least one computing task.

24. The method of claim 23, wherein the at least one first portion of the remaining non-executed subtasks and the at least one second portion of the remaining non-executed subtasks are the same portion.

* * * * *